Oct. 25, 1949.    A. S. FEINBERG    2,486,138
WATER CONTROL VALVE AND SYSTEM FOR
EVAPORATIVE COOLERS
Filed May 21, 1948    4 Sheets-Sheet 1
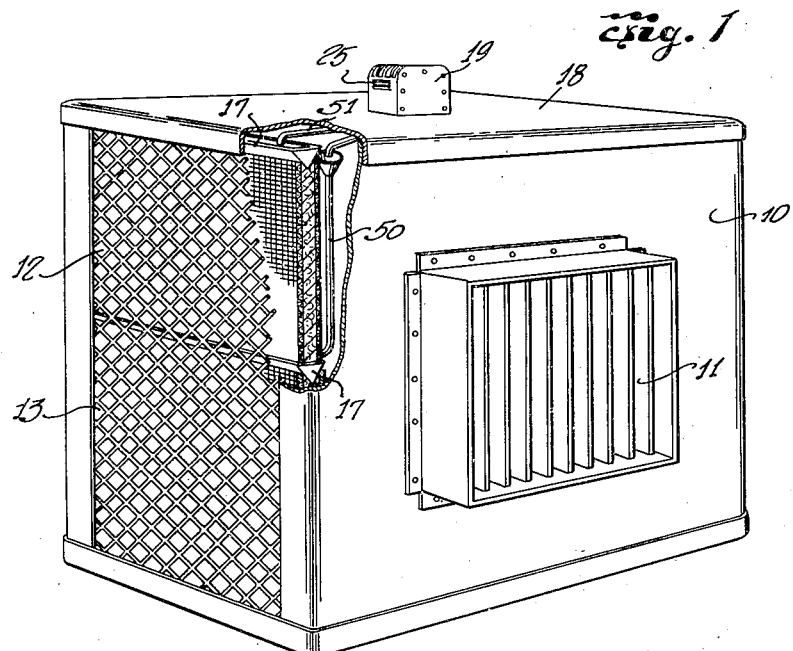
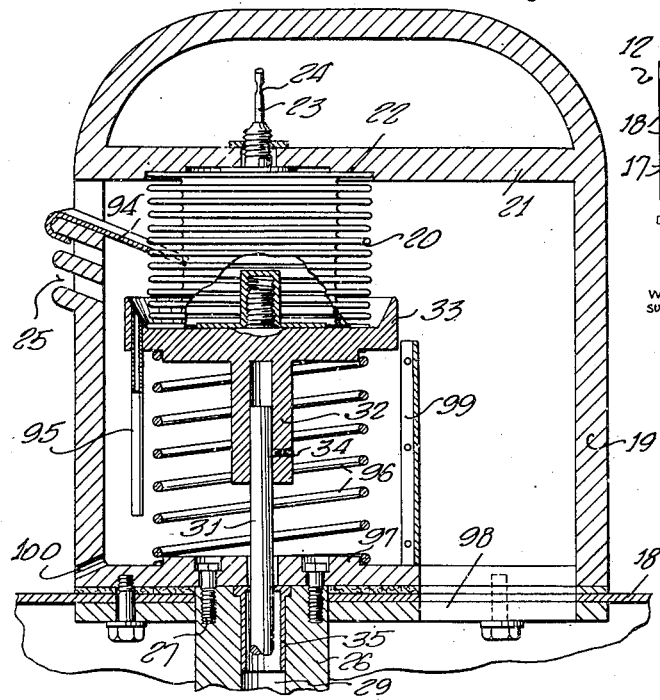
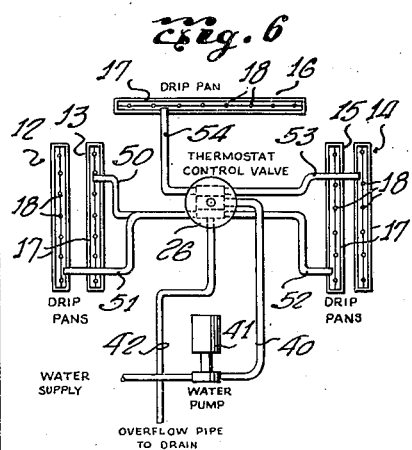
ARCHIE S. FEINBERG
INVENTOR.
BY
ATTORNEY

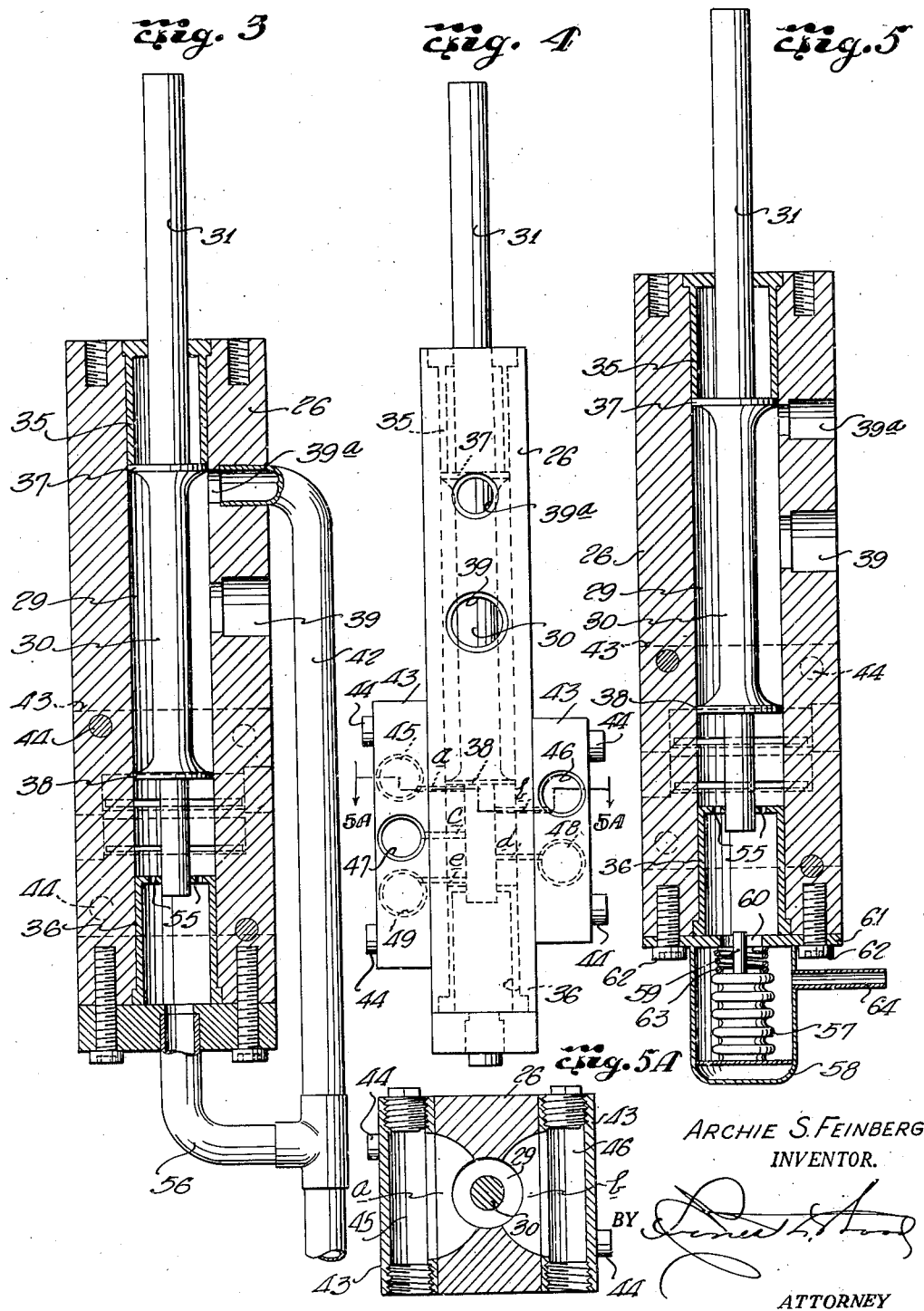

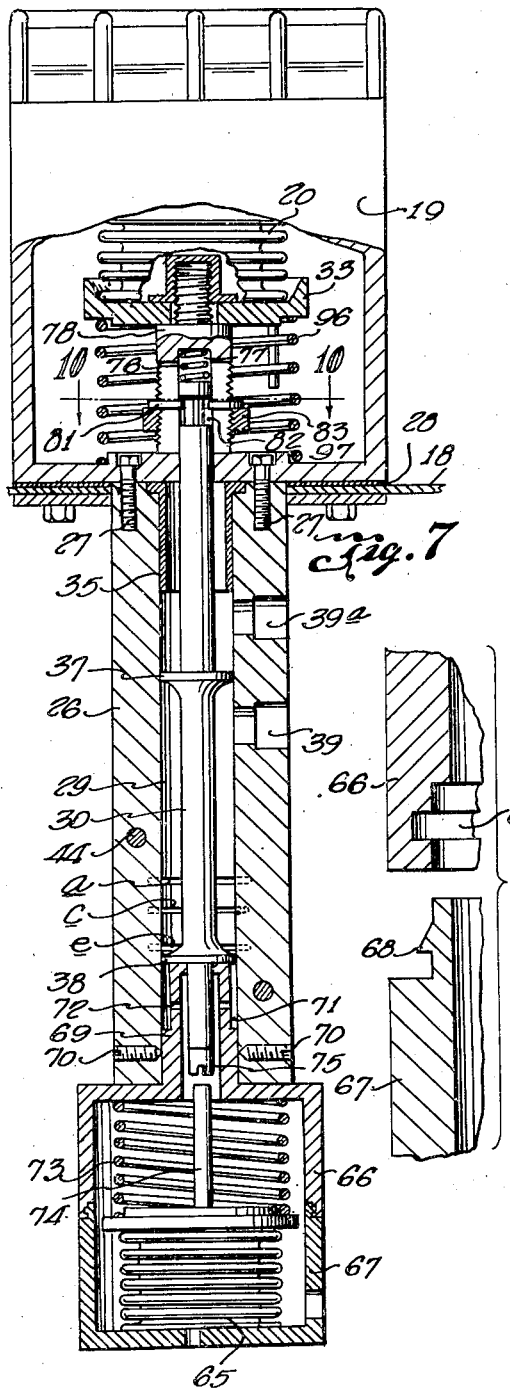

Oct. 25, 1949.　　A. S. FEINBERG　　2,486,138
WATER CONTROL VALVE AND SYSTEM FOR EVAPORATIVE COOLERS
Filed May 21, 1948　　4 Sheets-Sheet 4
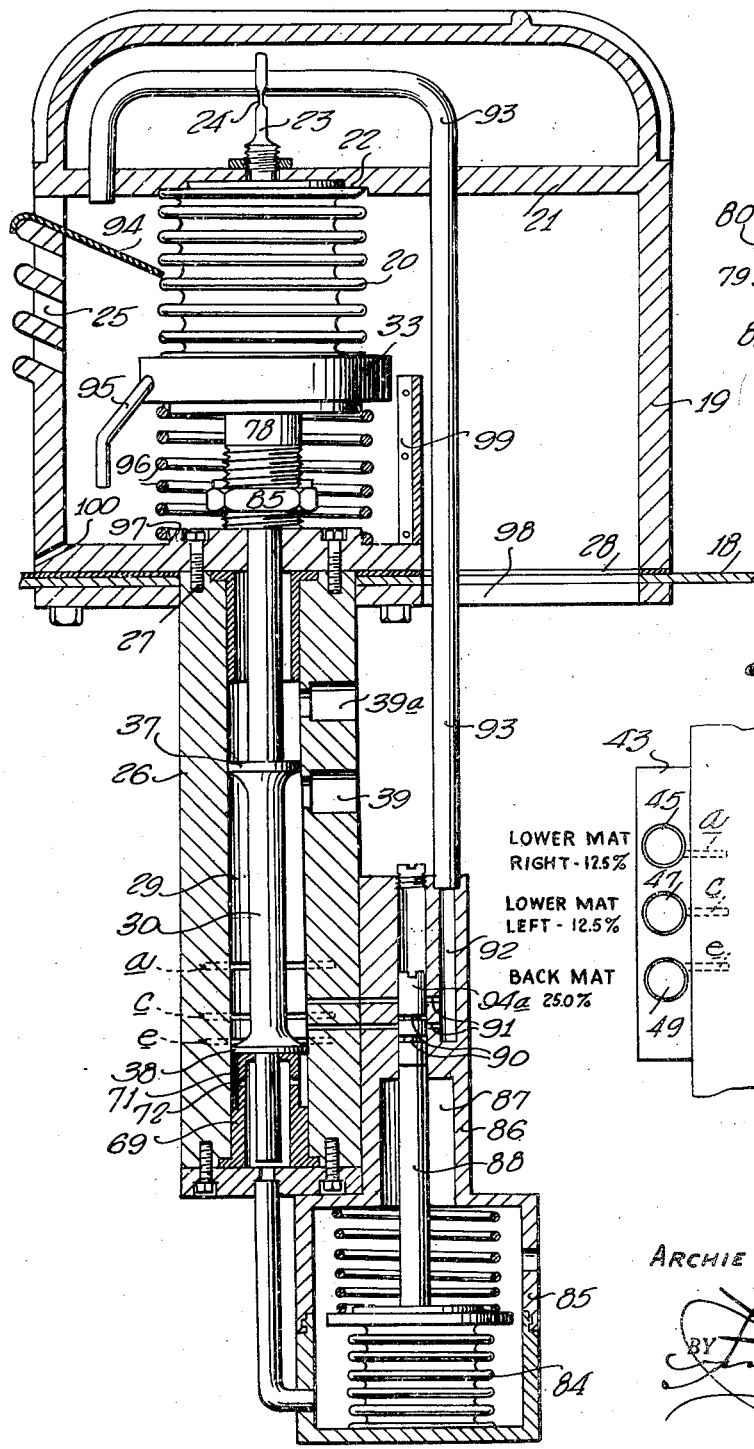
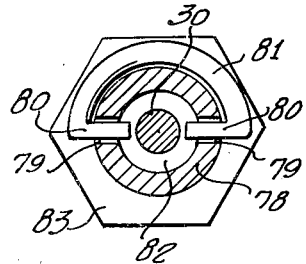
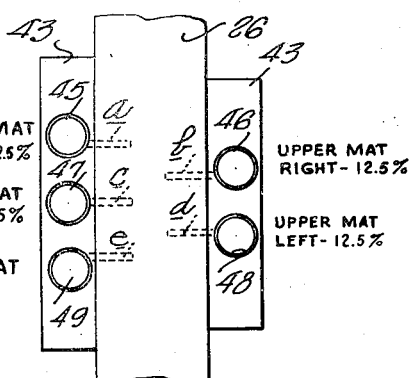
Archie S. Feinberg
INVENTOR.
ATTORNEY Patented Oct. 25, 1949

2,486,138

UNITED STATES PATENT OFFICE 2,486,138

WATER CONTROL VALVE AND SYSTEM FOR EVAPORATIVE COOLERS

Archie S. Feinberg, Dallas, Tex.

Application May 21, 1948, Serial No. 28,285

11 Claims. (Cl. 261—39)

This invention relates to evaporative coolers and it has more particular reference to a valve and related apparatus responsive to outdoor wet and dry bulb temperatures to predetermine the degree of moisturization of air expelled from the cooler in accordance with variations in external temperature and relative humidity.

The principal object of the invention is to compensate for certain inadequacies in evaporative type air cooling apparatus and render the same equally as efficient to create comfort in regions of relatively high humidity and in sections of the country where there is a wide divergence in wet and dry bulb temperatures. Moreover, the invention aims to accomplish the foregoing automatically and with minimum manual attention.

In the Midwest and northern sections of the United States, the differential in degrees between dry and wet bulb thermometers is not great, due to the fact that summer temperatures in this region are normally below 90° F. In contrast, this condition does not hold true in the extremely hot, arid regions of the Southwest. Because of the extremely high temperatures prevailing here the air's moisture saturation capacity is very high and full evaporation may be permitted without danger of over-humidification. As is well known, the hotter air becomes, the more moisture vapor it can carry; air roughly doubling its moisture carrying capacity with every 20° increase in temperature. Thus, the excellent performance without dampness, of the evaporative type cooler in hot, arid regions, while in other and more temperate climates its use is associated with complaints of humidity and atmospheric dampness.

It is therefore the object of the invention to compensate for the variable moisture carrying capacity of air at different temperatures, through the provision of a multi-zoned evaporative cooler and a thermally actuated valve having ports equalling in number the "zones" or filter mats of the cooler, the said valve fractionalizing and regulating the amount of water supplied to the various zoned areas of evaporative surface in strict accordance with variations in wet and dry bulb temperatures.

Another object of the invention is to provide a multi-port valve and an actuator consisting of a bellows charged with a suitable heat sensitive gas and so disposed that it will be responsive to outdoor temperatures and will operate the valve to open and close its ports and predetermine the area of the evaporative surface or zones of the cooler to be saturated in accordance with variations in said outdoor temperature.

Still another object of the invention is to provide means adapted to function when the wet bulb thermometer reaches a certain predetermined height, to reduce moisture evaporation within the cooler itself by maintaining the air in an increased moisture deficient state and enhancing evaporation in the space being conditioned. This means consists of an auxiliary wet bulb bellows disposed below and acting counter to the dry bulb bellows to exert a force on the plunger of the valve effective to close ports which would ordinarily be opened by the dry bulb bellows and thus prohibit over-saturation and evaporation of the zones of the cooler in cases when both dry and wet bulb temperatures are relatively high.

Yet another object of the invention is to provide the wet and dry bulb bellows and valve, arranged and performing as specified, combined with means for collecting and maintaining moisture in juxtaposition to the dry bulb bellows during summer showers of short duration where the outdoor temperature remains high and there is an increase in wet bulb temperature, the collected moisture being lower in temperature than that of the dry bulb, thus causing a contraction of the dry bulb bellows sufficient to close at least one port of the valve and shut off moisture to at least one zone of the cooler.

With the foregoing objects in view, the invention has further reference to certain features of accomplishment which will become apparent as the description proceeds, taken in connection with the accompanying drawings wherein:

Figure 1 is a perspective view of an evaporative cooler on which the invention is adapted to operate.

Figure 2 is a vertical sectional view of the dry bulb bellows and case.

Figure 3 is a view of the multi-port valve in vertical section.

Figure 4 is a side elevational view of the valve rotated 90° from Figure 3.

Figure 5 is a vertical sectional view of the valve similar to Figure 3 but showing attached to its lower end a wet bulb bellows.

Figure 5A is a transverse sectional view taken on line 5A of Figure 4.

Figure 6 is a schematic view of the various zones or filter mats of the evaporative cooler, showing the relative position of the thermally actuated valve and its discharge lines.

Figure 7 is a vertical sectional view of the valve and dry bulb bellows, showing a slightly modified form of wet bulb bellows.

Figure 8 is a view similar to Figure 7 but showing the wet bulb bellows in an operative position.

Figure 9 is a fragmentary sectional view showing the special joint between the upper and lower sections of the wet bulb bellows casing.

Figure 10 is a sectional view taken on line 10—10 of Figure 7.

Figure 11 is a fragmentary side elevational view of the valve housing, showing the discharge manifolds and ports and identifying these ports with their respective cooler mats, and Figure 12 is a vertical sectional view of the valve surmounted by the dry bulb bellows and its housing, the latter in section and showing on the bottom of the valve a further modification of a wet bulb bellows.

Continuing with a more detailed description of the drawing, reference is primarily made to Figure 1 wherein numeral 10′ denotes a cabinet having a louvered air outlet 11 in its front wall and whose rear and sides are open and covered by filter mats, preferably of the type consisting of wood fibers. It is important to observe that in one side of the cabinet there are two mats 12 and 13 one above the other. This is true also of the opposite side of the cabinet in which mats 14 and 15 are similarly arranged (Fig. 6). In the rear of the cabinet, however, there is but one mat 16 although this latter mat is equal in area to both mats of either side.

Above each of the five mats there is disposed a trough identified by the common reference numeral 17 and each trough has a series of apertures or outlet ports 18 in its bottom through which water is flowed into the mats to saturate the same.

While not shown in the drawing, a blower is arranged in the cabinet 10 to draw air through all of the mats and discharge the same through the louvered opening 11 into a space to be cooled.

Aside from the peculiar arrangement of filter mats shown and described, which constitutes the subject matter of a separate application Serial Number 842, January 7, 1948, the specific mat construction and purpose do not depart from the conventional. However, the particular manner in which water is distributed to the mats and controlled in accordance with variations in wet and dry bulb temperatures comprises the subject matter of the present invention and will be fully explained in the following description.

Adapted for mounting on the top 18 of the cabinet 10 is a housing 19 containing a Sylphon tube or diaphragm bellows 20. This bellows is charged with a heat responsive gas which will provide at least a vapor pressure differential between temperatures of 82° F. and 95° F. of ten pounds per square inch. The housing 19 is provided with a horizontal partition 21 which has an annular recess 22 in which the upper end of the bellows 20 is seated and is further apertured to accommodate the charging tube 23 of the bellows which is permanently closed after filling by pinching the tube 23 at 24. One wall of the bellows housing 19 is louvered at 25, as shown in Figures 2 and 12 for a purpose to be hereinafter explained.

Referring now to the valve which is actuated by the bellows 20 during dry bulb temperature changes, an elongated body 26 is provided which may be of any desirable cross-sectional shape but is preferably square. This body is secured by means of cap screws 27 to the underside of the bellows housing 19 and depends into the cabinet 10 through an opening provided therefor in the top of the cabinet. A heat insulating gasket 28 is disposed between the housing and cabinet top 18.

The valve body 26 has an axial bore 29 in which is reciprocally arranged a plunger 30. By referring to Figures 2 to 5, it will be observed that the plunger 30 has a stem 31 on its upper end which emerges from the body 26 and enters a sleeve 32 (Fig. 2) formed on and depending from a cup 33 in which rests the lower end of the bellows 20. A set screw 34 is threaded through the sleeve 32 and bears against the stem 31, holding the parts in fixed relationship and provides an adjustment to predetermine the displacement of the valve plunger 30 when actuated by the expansive and contractive movements of the bellows 20.

In the top of the bore 29 is a thimble 35 which serves a dual purpose of providing an upper bearing for the plunger stem 31 and as a stop to limit upward displacement of the plunger 30. Similarly, a thimble 36 is arranged in the lower end of the bore 29 and limits downward displacement of the plunger.

The plunger 30 has formed thereon a pair of spaced apart flanges 37 and 38. These flanges are of a diameter slightly less than the diameter of the bore 29 in the valve body and provide a sliding fit. The uppermost flange 37 is movable in relation to a water inlet port 39 to which water is supplied through a tube 40 (Fig. 6) connected to a pump 41 or to a municipal water line, as desired. Above the inlet port 39 is an overflow or water return port 39a through which water flows into a tube 42 and is returned thereby to the reservoir pan in the bottom of the cabinet 10, provided, of course, that the valve plunger is positioned as shown in Figures 3 and 5 which is its position when the outside temperature is below 82° F., during which the bellows 20 is contracted.

The lowermost flange 38 of the valve plunger 30 controls passage of water through one or more outlet ports below the midsection of the valve body. These ports are made by sawing through the wall of the valve body 26 with a circular saw, as exemplified in Figure 5A in order to provide maximum outlet. Manifold plates 43 are secured by means of bolts 44 to the walls of the valve body and each is provided with bores communicating with respective outlet ports in the body.

To identify the various water outlet ports in the valve body, reference is made to Figures 4 and 11 wherein $a$ denotes the uppermost port which communicates with a bore 45 in a manifold 43 and through which water is conveyed to the lower section of the mat on the right hand side of the cabinet 10. The next lowest port $b$ communicates with a bore 46 in the opposite manifold 43 and serves the upper section of the right hand mat. The next lowest port $c$ communicates with a manifold bore 47 and serves the lower section of the mat on the left hand side of the cabinet 10. Port $d$ communicates with a bore 48 in the opposite manifold 43 and serves the upper mat on the left hand side of the machine and port $e$ communicates with a bore 49 in a manifold and serves the entire rear mat which is single. In Figure 6, tubes 50, 51, 52, 53 and 54 communicate respectively with the bores 45, 46, 47, 48 and 49 of the manifolds 43 and extend to the mats 12, 13, 14, 15 and 16 to deliver water thereto in accordance with the position of the plunger 30 in the bore of the valve body.

As the outside temperature rises, say, to 82° F., bellows 20 will expand and the valve plunger 30 will travel downward in the bore 29. The overflow at 39a will be cut off when the upper flange 37 moves below this port and water will pass through port a, since the lower plunger flange 38 will have receded below the same, hence water will pass through tube 59 to wet the lower section 13 of the right hand mat, whose area represents 12.5% of the total mat area.

When the outside temperature rises to 85° F., bellows 20 will expand still further to depress plunger 30 below port b, whereupon water will flow to the trough serving the upper section 12 of the right hand mat. Thus, a cooling efficiency of 25% of the wet bulb depression is obtained. An outside temperature of 88° F. causes the bellows to actuate the valve plunger still more until ports c, d, and e, are opened to water from pump 41, provided, of course, that the temperature reaches 94° F. Only when the outside temperature rises to 94° F., do all sections of the mats become wetted, for then, further bellows expansion forces plunger 30 to its bottom of the bore 29, opening all ports for maximum saturation of the mats.

Conversely, as the outside temperature decreases, the bellows 20 contracts and causes the valve plunger to move upwardly. Closing of the lowest port e will shut off water to the back mat of the cooler which represents one-third of the total mat surface. Further lowering of temperature will cause progressive closing of ports d, c and b and finally port a if the temperature falls below 82° F.

The valve is so designed that any water seeping past the flanges 37 and 38, instead of accumulating to possibly retard the action of the plunger, is allowed to escape through the port 39a at the top and through bleeder ports 55 (Figures 3 and 5) in the bottom stop thimble 36 into the return pipe 42, through connecting tube 56.

The described thermally actuated valve governed alone by the dry bulb temperature of the outdoor air is ineffective in high dry bulb-high wet bulb regions such as in the southern portions of the United States, notably Louisiana, Alabama, and Mississippi. Temperatures in such climate are high, usually in the middle and high nineties or sufficiently high to cause the valve to deliver maximum water to all evaporative surfaces. Passing this hot, latent heat-laden air through the wetted mats of an evaporative cooler would leave conditioned premises in a highly humid state. To further aggravate the condition, wet bulb (total heat) temperatures are also extremely high, normally ranging from 78° to 82° and uninhibited moisture evaporation only serves to create results uncomfortably high in latent heat and humidity.

A greater degree of interior atmospheric comfort under these extreme conditions may be achieved by regulating moisture evaporation when the wet bulb thermometer rises to a predetermined point. To accomplish this, a wet bulb control has been added to the valve mechanism which, in other more temperate climates, is actuated by dry bulb thermometer temperatures only. This wet bulb attachment commences to function only when the wet bulb thermometer has reached a certain predetermined height. At this and higher levels, greater interior comfort is had by reducing evaporation within the cooler itself and enhancing evaporation in the space being conditioned.

The wet bulb attachment referred to is comprised of a small bellows 57 (Fig. 5) encased in a housing 58 attached to the bottom of the valve body 26. The bellows 57 has a stem 59 which extends upwardly through an orifice 60 in a plate 61, affixed to the bottom of the valve body 26 by cap screws 62. A coil spring 63 resists expansive movements of the bellows and is disposed between the top of the bellows and the plate 61.

In the function of an evaporative cooler, the aeration and evaporation of the recirculated water therein causes the water in the cooler reservoir to assume a temperature that coinsides substantially with that of the wet bulb temperature of the outdoor atmosphere. The temperature of the water flowing through the valve bore 29 therefore is the same as that of the outdoor wet bulb temperature. At all times, when the wet bulb (total heat) temperature is below 78°, valve actuation and functioning is accomplished entirely by the outdoor dry bulb (Fahrenheit) temperature. However, when the wet bulb temperature reaches 78 degrees, the wet bulb bellows 57 begins to expand, due to the passage of water through ports 55 (Fig. 5) and orifice 60 into the housing 58 at outdoor wet bulb temperature. Such expansion of the bellows 57 raises the stem 59 to bear against the lower end of the valve plunger 30 and raise the same an equal amount or to such extent that one or more of the lowermost ports a, b, c, d, and e will be closed, thereby shutting off a certain percentage of water to the mats and consequently reducing the area of effective evaporative surface. An overflow tube 64 predetermines the level of water in the bellows housing 58. A greater percentage of such surface is curtailed should the wet bulb temperature climb higher.

A preferred form of wet bulb attachment is shown in the variation disclosed in Figures 7, 8 and 9. Other related elements, such as the dry bulb bellows and valve, being of substantially the same construction as shown in Figures 1 to 6, the same reference numerals are used to indicate like parts.

In the modified form, the wet bulb bellows 65 is arranged in a housing made in separable sections 66 and 67, connected together by means of a joint consisting of an annular protuberance 68 (Fig. 9) formed on section 67 which is receivable in an annular groove 68a made interiorly of the upper housing section 66.

The housing section 66 has a tubular neck portion 69 receivable in the lower end of the plunger bore 29 of the valve body 26 and is held therein by means of opposed set screws 70. The upper portion of the neck 69 is reduced in diameter to define an annular space 71 into which water at wet bulb outdoor temperature enters from the bore 29. Ports 72 in the neck 69 effect communication between the annular space 71 and the interior of the neck so that water may enter the housing containing the wet bulb bellows 65 to actuate the latter when the wet bulb temperature reaches a predetermined degree, usually 78°, as heretofore mentioned.

When the wet bulb bellows 65 commences to expand, the coil spring 73 is contracted and the stem 74 of the bellows rises into the neck 69 of the bellows housing, which likewise serves as a guide for the lower end of the valve plunger 30. The stem 74 bears against and raises the plunger sufficiently to close at least the lowest port e in the valve body 26 which port serves the rear mat of the cooler, representing one-third of the total evaporative mat surface. With this amount of the evaporative surface curtailed, a greater degree of interior atmospheric comfort will prevail.

An important feature of the arrangement resides in the adjustment afforded in a screw 75 in the lower end of the valve plunger 30 (Figs. 7 and 8) which predetermines the degree of displacement of the valve plunger by the wet bulb bellows 65 and affords a means for precision modulation.

The wet bulb bellows 65 does not actually resist the dry bulb bellows 20 in bringing about the desired condition expressed. Instead, a certain degree of displacement between the valve plunger 30 and the dry bulb bellows 20 is afforded by a coil spring 76 (Figs. 7 and 8) which is disposed in a bore 77 in a depending stem 78 formed on the cup 33 in which the bellows 20 is disposed. Figure 7 shows the spring 76 relaxed while Fig. 8 shows the spring collapsed under pressure exerted on the plunger from below by the bellows 65 to close the lowest port e in the valve body 26.

An adjustment in the degree of longitudinal displacement of the valve plunger 30 is afforded by slotting the stem 78 at 79 (Fig. 10) and disposing therein the confronting legs 80 of an arcuate key 81. The key embraces one side of the stem 78 and its legs enter an annular groove 82 cut in the plunger 30 adjacent its upper end. A nut 83 is movable on the threaded exterior of the stem 78 and by adjusting the position of this nut on the stem, the key 81 is raised or lowered to accordingly increase or decrease the range of temperature levels, to correspond to temperature differentials in various climates.

In Figure 12 is shown a further modification of the wet bulb attachment. The other elements of the combination are substantially the same in construction and function as those shown in preceding views and hence are identified by the same reference numerals. In Figure 12, a bellows 84 is arranged in a sectional housing 85 which is mounted below the bottom of the valve body 26 but is axially offset in relation thereto. The housing has a neck portion 86 which is affixed in parallelism to the valve body and is provided with a bore 87 into which extends the stem 88 of the bellows 84. A guide 89 is formed in the neck 86 to slidingly retain the stem 88.

The stem 88 has a pair of spaced apart, annular grooves 90 therein near its top which, when brought into register with correspondingly spaced passages 91 through the valve body 26 and neck 86, admit water from the bore 29 of the valve body into a vertical passage 92 in the neck 86. Water thus bypassed from the valve body 26 enters a riser 93 communicating with the passage 92 and is thereby conveyed upwardly and is deposited onto an inclined plate 94 which directs the water at reservoir temperature onto the dry bulb bellows 20 with the obvious result that the bellows will at once begin to contract due to lowered temperature. Contraction of bellows 20 will consequently raise the valve plunger 30 to bring its lowermost flange 38 into a position to close one or more of the lower ports in the valve body, thus shutting off a predetermined amount of water to the mats. The upper end of the stem 88 of the bellows 84 is provided with a screw driver adjustment 94a by which to alter the position of the grooves 90 with respect to the passages 91.

The cup 33 in which the bellows 20 is seated is designed to retain a quantity of water at a level predetermined by an overflow tube 95 (Figs. 2 and 12). The water retained therein is supplied, either by the riser 93 or by rainwater falling on the bellows housing 19 and flowing through louvered openings 25 onto inclined plate 94 and thereby onto the bellows 20. The water causes delayed action of the bellows 20 during brief summer showers and on "muggy" days when over-saturation of air is not conducive to comfort. The temperature of the water collected in the cup 33 is equal to that of the rain water and in some cases, to that of the water delivered by the riser 94. In either case, however, the result is the same, that of automatically reducing the saturated area of the evaporative surface in accordance with variations in wet bulb temperatures.

In all cases, the dry bulb bellows 20 expands against the resistance of a coil spring 96, interposed between the bottom of cup 33 and the base of the bellows housing 19, on which a boss 97 is formed to retain the spring.

Adjacent the dry bulb bellows 20 and covered by the housing 19 thereof, is an opening 98 in the top 18 of the cabinet 10 which causes a slight suction, influencing air through the louvered openings 25 in the case and across the bellows 20 so that the mean temperature within the housing 19 will more nearly equal that of the outdoor dry bulb temperature and the bellows will respond with accuracy to any slight external temperature changes, except when otherwise influenced by rainwater or water conveyed by the riser 93, as described.

Overflow water from the cup 33 or rainwater entering the housing 19 through openings 25 will be prevented from entering the opening 98 in the cabinet top by means of a baffle plate 99. Such overflow water is released from the housing 19 by means of an orifice 100 in the wall thereof.

It is clearly evident from the foregoing that when an evaporative cooler is installed out-of-doors, usually on top of a building, and is equipped with automatic control such as described, the water supply regulating valve will be actuated by the dry bulb bellows 20 to increase the supply of water to the sectional evaporative surface in direct ratio to increasing exterior temperature. Correspondingly, lowering of temperature will result in the decreasing of water supply to the evaporative surfaces.

On the other hand, a rise in wet bulb temperature will bring into operation the wet bulb bellows, tending to counteract the effects of the dry bulb bellows which is still subject to expansion under remaining high dry bulb temperature. The counteracting effect of the wet bulb bellows will be to reduce moisture evaporation to a point below that which the already moist air can absorb, resulting in a balanced atmospheric condition impossible of manual attainment.

Manifestly, the construction as shown and described is capable of some modification and such modification as may be constructed to fall within the scope and meaning of the appended claims is also considered to be within the spirit and intent of the invention.

What is claimed is:

1. A water control system for evaporative coolers including a plurality of filter mats constituting a common evaporative surface, a valve body having an inlet for water under pressure and having a plurality of water discharge ports, each having communication with a respective filter mat, a valve in said valve body in control of said ports, a bellows containing gas responsive to variation in external dry-bulb temperatures for actuating said valve to determine the degree of saturation of said evaporative surface and a second bellows containing gas responsive to variations in wet bulb temperatures for limiting the port opening action of said valve.

2. A water control system for evaporative coolers, a plurality of filter mats constituting a common evaporative surface, each having an individual water supply line, a valve body having an inlet for water under pressure and having a plurality of ports to which said supply lines are individually connected, a valve in said valve body, a bellows containing gas sensitive to external temperatures and adapted to actuate said plunger to open and close ports in said body to predeterminately vary the degree of saturation of said evaporative surface in accordance with variations in external dry bulb temperature and a second bellows containing gas sensitive to variations in wet bulb temperatures to counteract the effects of said first bellows and maintain in closed position certain of the ports of said valve body.

3. In an evaporative cooling unit, a plurality of separately saturatable filter mats comprising a common evaporative surface; a valve body adapted to be connected with a source of water under pressure and having a water discharge port in communication with each of said mats; a plunger reciprocable in said valve body for selectively opening and closing said ports; a bellows containing gas sensitive to external dry bulb temperatures and adapted to actuate said plunger and determine the degree of saturation of said evaporative surface; and a second bellows containing gas responsive to variations in wet bulb temperatures and adapted to limit the port opening action of said plunger during periods of relatively high humidity.

4. In an evaporative cooler, a plurality of filter mats having individual water supply lines; a valve body adapted to be connected with a source of water under pressure and having a series of discharge ports to which said supply lines are individually connected; a plunger reciprocable in said valve body and controlling said ports; a pair of counteracting gas filled bellows, one of which is responsive to external dry bulb temperatures, the other is responsive to wet bulb temperatures; said pair of bellows jointly controlling the movement of said plunger to regulate the supply of water to said mats so that the evaporative efficiency of said cooler becomes a function of the outdoor dry bulb and wet bulb temperatures.

5. A water control valve for evaporative coolers comprising an elongated valve body having a water inlet and having a series of spaced apart discharge ports therein; a plunger reciprocable in said valve body for successively opening and closing said ports; a bellows containing heat sensitive gas adapted to actuate said plunger; a second gas filled bellows adapted to engage said plunger, and means for exposing said latter bellows to a portion of the water discharge of said valve body at a temperature differential effective to actuate said second bellows counter to said first bellows to retard the full opening action of said plunger.

6. In an evaporative cooling unit, a plurality of filter mats; a valve connected with a source of water under pressure and having a water discharge port in communication with each of said mats; a movable member to control the ports of said valve, a dry bulb sensitive bellows and a wet bulb sensitive bellows operating counter to each other and connected to said movable member to respectively open said valve ports during a rise in dry bulb temperature, and during a rise in wet bulb temperature to predetermine the degree of saturation of said mats in accordance with relative variations in wet and dry bulb temperatures.

7. Apparatus as set forth in claim 6 in which yieldable means is interposed between the movable member and dry bulb bellows to provide for relative displacement of said bellows and member during the function of the wet bulb bellows; and means for adjusting the degree of displacement of said movable member with respect to said dry bulb bellows.

8. Apparatus as set forth in claim 6 in which means is provided for lengthening and shortening the effective thrust of the wet bulb bellows to adjust the degree of displacement thereby of the valve plunger.

9. Apparatus as set forth in claim 6 in which a cup is disposed to collect rain water and hold the same in intimate contact with the dry bulb bellows to influence contractive action thereof during periods of relatively high humidity.

10. Apparatus as set forth in claim 6 in which a housing encloses the dry bulb bellows, said housing having openings therein to receive rainwater; and means for directing said rainwater onto said bellows to influence the contracting action thereof.

11. A water control system for evaporative coolers having a reservoir and a plurality of filter mats constituting a common evaporative surface comprising a valve body having an inlet for water under pressure and having a separate water discharge port communicating with each of said mats; a valve in said valve body adapted to progressively control the flow of water through the ports depending on the position of the valve with respect to the valve body; a bellows containing a medium sensitive to external dry-bulb temperatures adapted to actuate said valve to determine the individual degree of saturation of said mats; and a return pipe from said valve body to said reservoir adapted to relieve the water pressure within said valve body when the ports are closed by the valve.

ARCHIE S. FEINBERG.

REFERENCES CITED

The following references are of record in the file of this patent:

UNITED STATES PATENTS

| Number | Name | Date |
| --- | --- | --- |
| 1,228,718 | Thompson et al. | June 5, 1917 |
| 1,284,334 | Hodge | Nov. 12, 1918 |
| 2,108,587 | Jones | Feb. 15, 1938 |
| 2,296,155 | Feinberg | Sept. 15, 1942 |
| 2,413,150 | McReynolds | Dec. 24, 1946 |